United States Patent
Koyanagi et al.

(10) Patent No.: US 8,601,993 B2
(45) Date of Patent: Dec. 10, 2013

(54) ENGINE BALANCER DEVICE

(75) Inventors: Masashi Koyanagi, Wako (JP);
Yoshinobu Ozaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 318 days.

(21) Appl. No.: 12/933,651

(22) PCT Filed: Feb. 17, 2009

(86) PCT No.: PCT/JP2009/000621
§ 371 (c)(1),
(2), (4) Date: Sep. 20, 2010

(87) PCT Pub. No.: WO2009/118992
PCT Pub. Date: Oct. 1, 2009

(65) Prior Publication Data
US 2011/0011364 A1   Jan. 20, 2011

(30) Foreign Application Priority Data
Mar. 28, 2008   (JP) .................. 2008-087426

(51) Int. Cl.
*F02B 75/06* (2006.01)
(52) U.S. Cl.
USPC ......... 123/192.2; 123/192.1; 74/603; 74/604; 464/180
(58) Field of Classification Search
USPC ............... 123/192.1, 192.2; 464/180; 74/595–598, 603–605
See application file for complete search history.

(56) References Cited

U.S. PATENT DOCUMENTS

| | | | | |
|---|---|---|---|---|
| 2,182,988 | A * | 12/1939 | Iseler | 74/604 |
| 4,545,341 | A * | 10/1985 | Corey et al. | 123/192.2 |
| 4,617,885 | A | 10/1986 | Oshiro et al. | |
| 4,622,934 | A * | 11/1986 | Oyama | 123/197.4 |
| 6,626,139 | B1 * | 9/2003 | Horita et al. | 123/192.2 |
| 6,827,056 | B2 * | 12/2004 | Cholewczynski | 123/192.1 |
| 6,990,942 | B2 * | 1/2006 | Takeuchi | 123/192.2 |
| 7,013,859 | B2 * | 3/2006 | Linnig | 123/192.1 |
| 7,089,904 | B2 * | 8/2006 | Morii et al. | 123/196 R |
| 7,143,734 | B1 * | 12/2006 | Leppanen et al. | 123/192.1 |
| 7,162,989 | B2 * | 1/2007 | Arakawa | 123/192.1 |
| 7,748,292 | B2 * | 7/2010 | Takeuchi | 74/595 |
| 8,047,175 | B2 * | 11/2011 | Nishi et al. | 123/192.2 |
| 8,220,431 | B2 * | 7/2012 | Okamoto et al. | 123/192.2 |
| 2004/0244757 | A1 | 12/2004 | Takeuchi | |
| 2006/0037576 | A1 | 2/2006 | Nakayama | |

FOREIGN PATENT DOCUMENTS

| | | | | |
|---|---|---|---|---|
| JP | 56046140 A | * | 4/1981 | F16F 15/26 |
| JP | 57-195944 A | | 12/1982 | |
| JP | 2-49422 B2 | | 10/1990 | |
| JP | 2005-16511 A | | 1/2005 | |
| JP | 2006-57651 A | | 3/2006 | |

* cited by examiner

*Primary Examiner* — Noah Kamen
*Assistant Examiner* — Grant Moubry
(74) *Attorney, Agent, or Firm* — Birch, Stewart, Kolasch & Birch, LLP

(57) ABSTRACT

An engine balancer device is provided that can prevent an increase in the number of component parts and the enlargement of an engine.

The balancer weight includes a primary balancer 201 rotated at the same speed as, and in a counter direction to a crankshaft 105 and a coupling balancer for suppressing moment force resulting from the reciprocative weight of the engine 17. The coupling balancer is integrally provided on a driven gear 177 for transmitting rotation of the crankshaft 105 to the primary balancer 201.

7 Claims, 8 Drawing Sheets

ENGINE BALANCER DEVICE

TECHNICAL FIELD

The present invention relates to an engine balancer device.

BACKGROUND ART

Engines in which a piston reciprocates in a cylinder generate primary inertial force resulting from the reciprocative movement of the piston. The primary inertial force causes engine vibrations. The engines of this type include the so-called V-type engine in which cylinders are arranged in a V-shape. If an angle of the cylinders in the V-type engine is 90 degrees, the primary inertial forces resulting from the reciprocative movement of the pistons in the cylinders cancel each other to reduce engine vibration.

On the other hand, if the angle of the cylinders is smaller or greater than 90 degrees, the primary inertial force remains unchanged. To avoid this, a motorcycle engine comprising a primary balancer adapted to cancel the primary inertial force is provided (for example, see Patent Documents 1 and 2).

Patent Document 1: JP-A No. 2005-16511
Patent Document 2: JP-P No. Hei 2-49422

DISCLOSURE OF THE INVENTION

Problem to be Solved by the Invention

Although the primary balancer is adopted, moment force is left which results from the offset of a piston cylinder axis and from the fact that it is difficult to set the gravity center of an engine at the center. The engine vibration caused by the moment force is left. To cancel such engine vibration, it is conceivable to provide a balancer shaft comprising a coupling balancer weight.

However, the addition of the balancer shaft increases the number of components and the size of the engine accordingly. This is not desirable for the motorcycle engines needed to reduce the weight and be made compact compared with automobile engines.

The present invention has been made in view of the situations described above and it is an object of the present invention to provide an engine balancer device that can prevent an increase in the number of components and the enlargement of an engine.

Means of Solving the Problem

To solve the above problem, the present invention is characterized in that in an engine balancer device equipped with an inertial force balancer provided with a balancer weight rotated synchronously with a crankshaft of an engine to prevent vibration resulting from reciprocative weight of the engine, the balancer weight includes a primary balancer rotated in a counter direction at the same rate as the crankshaft and a coupling balancer for suppressing moment force resulting from the reciprocative weight of the engine and the coupling balancer is integrally provided on the driven gear for transmitting rotation of the crankshaft to the primary balancer.

According to the present invention, the balancer weight includes the primary balancer rotated in a counter direction at the same rate as the crankshaft and the coupling balancer for suppressing moment force resulting from the reciprocative weight of the engine and the coupling balancer is integrally provided on a driven gear for transmitting rotation of the crankshaft to the primary balancer. Therefore, the balancer shaft can be shared by the primary balancer and the coupling balancer to prevent an increase in the number of components and the enlargement of the engine. In addition, the coupling balancer can reduce moment force resulting from the offset of the piston cylinder axis and from the fact that it is difficult to set the gravity center of the engine at the center.

The engine is a motorcycle engine in which cylinders are arranged in a V-shape so as to be angled from each other at a predetermined angle in a front and rear direction and a transmission is provided integrally with and rearward of the engine. The primary balancer is composed of two-shaft primary balancers arranged to be divided in the back and forth direction of the crankshaft. The coupling balancer may be provided on a driven gear of the primary balancer provided rearward. With this configuration, since the coupling balancer is provided on the driven gear of the primary balancer provided rearward, the coupling balancer functioning as a moment balancer can be arranged at a position close to the gravity center of the engine to facilitate handling of the vehicle body.

The balancer shaft provided with the driven gear may be provided with a drive gear for transmitting the rotation of the balancer shaft to the main shaft of the engine and the coupling balancer may integrally be provided with a driven gear for transmitting rotation of the crankshaft to the primary balancer and the drive gear respectively. With this configuration, since the driven gear and drive gear provided on the balancer shaft are each provided with the coupling balancer, the flexibility of layout of various engine parts can be increased.

The present invention is characterized in that in an engine balancer device equipped with an inertial force balancer provided with a balancer weight rotated synchronously with a crankshaft of an engine to prevent vibration resulting from reciprocative weight of the engine, the balancer weight includes a primary balancer rotated in a counter direction at the same rate as the crankshaft and a coupling balancer for suppressing moment force resulting from the reciprocative weight of the engine, the primary balancer is formed on an intermediate shaft for transmitting rotation of the crankshaft to a main shaft, and the coupling balancer is integrally provided on a drive gear for transmitting rotation of the intermediate shaft to the main shaft. According to this invention, since the intermediate shaft is used as a balancer shaft shared by the primary balancer and the coupling balancer, an increase in the number of components and the enlargement of the engine can be prevented. In addition, the coupling balancer can reduce the moment force resulting from the offset of the piston cylinder axis and from the fact that it is difficult to set the gravity center of the engine at the center.

Effect of the Invention

In the present invention, the balancer weight includes the primary balancer rotated in a counter direction at the same rate as the crankshaft and the coupling balancer for suppressing moment force resulting from the reciprocative weight of the engine and the coupling balancer is integrally provided on the driven gear for transmitting rotation of the crankshaft to the primary balancer. Therefore, an increase in the number of components and the enlargement of the engine can be prevented.

Since the coupling balancer is provided on the driven gear of the primary balancer provided rearward, the coupling balancer functioning as a moment balancer can be disposed at a position close to the gravity center of the engine to facilitate handling of the vehicle body.

Since the driven gear and the drive gear provided on the balancer shaft are each provided with the coupling balancer, the flexibility of layout of various engine parts can be increased.

The primary balancer is formed on the intermediate shaft for transmitting the rotation of the crankshaft to the main shaft and the coupling balancer is integrally provided on the drive gear for transmitting the rotation of the intermediate shaft to the main shaft. Therefore, an increase in the number of components and the enlargement of the engine can be prevented.

DESCRIPTION OF REFERENCE NUMERALS

Figure 1:
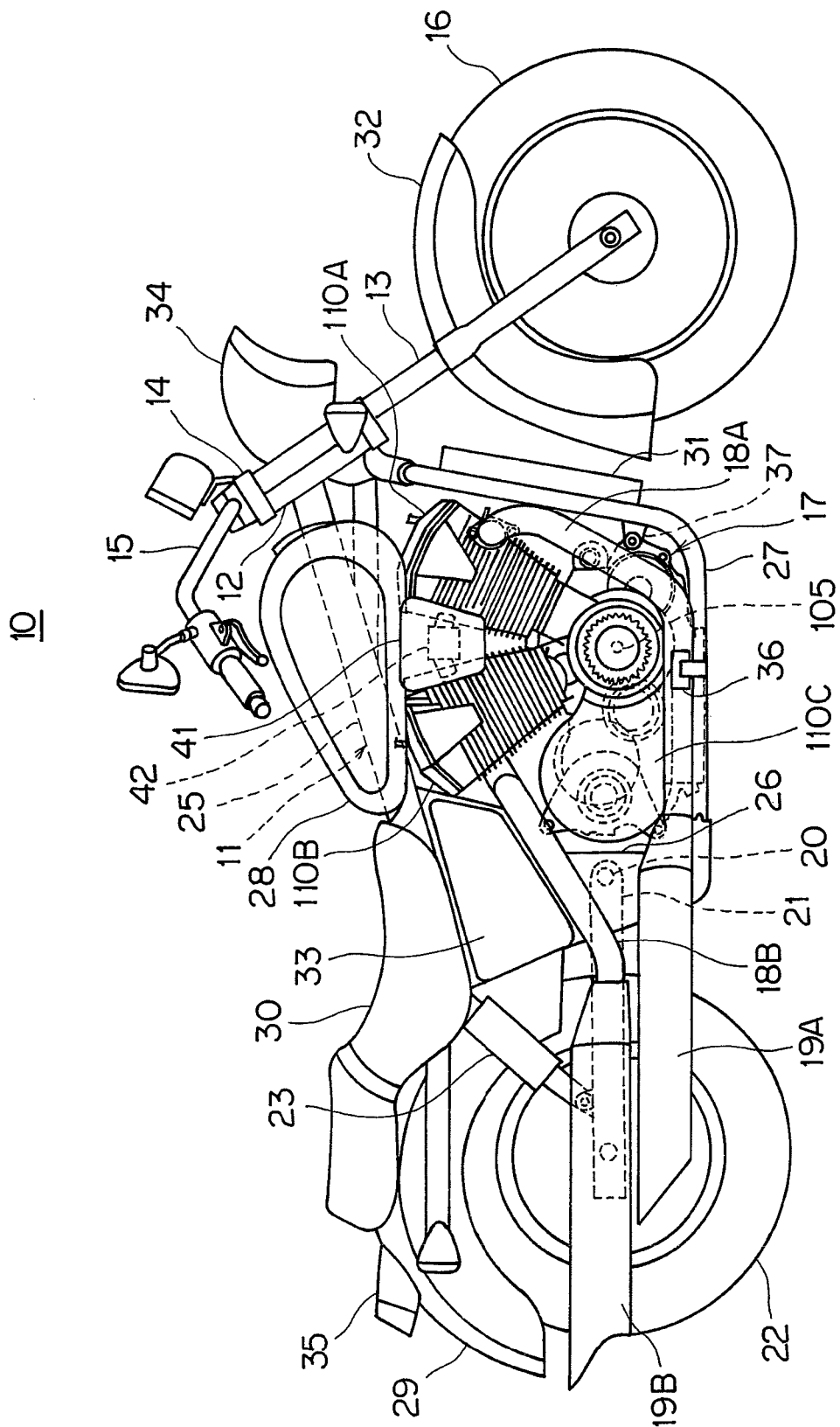
FIG. 1 is a lateral view of a motorcycle according to an embodiment of the present invention.

10 Motorcycle
17 Engine
105 Crankshaft
110A Front bank (cylinder)
110B Rear bank (cylinder)
121 Intermediate shaft (balancer shaft)
123 Main shaft
125 Countershaft
128 Drive shaft
136 Piston
175 Crank side drive shaft
177 Intermediate side driven gear (driven gear)
177X, 182X Thinned portion
181 Oil pump drive sprocket
182 Intermediate side drive gear (drive gear)
191 Main side driven gear
193 Clutch mechanism
196 Transmission
201, 206 Balancer weight (primary balancer)
207 Driven gear

BEST MODE FOR CARRYING OUT THE INVENTION

An embodiment of the present invention will hereinafter be described with reference to the accompanying drawings. It is to be noted that directions such as front and back or rear, left and right, and upside and downside are based on a vehicle body in the description.

FIG. 1 is a lateral view of a cruiser type motorcycle according to an embodiment of the present invention.

The motorcycle 10 includes a body frame 11; a pair of left and right front forks 13 turnably supported by a head pipe 12 mounted to the front end of the body frame 11; a steering handlebar 15 attached to a top bridge 14 supporting the upper end of the front forks 13; and a front wheel 16 rotatably supported by the front forks 13. The motorcycle 10 further includes an engine 17 supported by the body frame 11; exhaust mufflers 19A and 19B connected to the engine 17 via exhaust pipes 18A and 18B, respectively; a rear swing arm 21 vertically swingably supported by a pivot 20 at a rear lower portion of the body frame 11; and a rear wheel 22 rotatably supported by the rear end of the rear swing arm 21. A rear cushion 23 is disposed between the rear swing arm 21 and the body frame 11.

The body frame 11 includes a main frame 25 extending rearward downwardly from the head pipe 12; a pair of left and right pivot plates 26, which is also called the center frames, connected to the rear portion of the main frame 25; and a down tube 27 extending downward from the head pipe 12, then bending, extending, and connecting with the pivot plate 26. A fuel tank 28 is supported by the main frame 25 to straddle it. A rear portion of the main frame 25 extends above the rear wheel 22 and supports a rear fender 29. A seat 30 extends from on the rear fender 29 to the fuel tank 28 and is supported thereby. In addition, reference numeral 31 indicates a radiator supported by the down tube 27, 32 indicates a front fender, 33 indicates a side cover, 34 indicates a headlight, 35 indicates a taillight, and 36 indicates a step.

The engine 17 is supported in a space defined by the main frame 25, the pivot plates 26 and the down tube 27. The engine 17 is a V-Twin water-cooled 4-cycle engine whose cylinders are longitudinary banked in a V-shape. The engine 17 is supported by the body frame 11 via engine brackets 37, which is partially illustrated in FIG. 1, so that a crankshaft 105 may be oriented in a leftward-rightward horizontal direction relative to the vehicle body. The power of the engine 17 is transmitted to the rear wheel 22 via a drive shaft (not shown) disposed on the left side of the rear wheel 22.

The engine 17 is formed such that an angle, also call the bank angle, formed between a front bank 110A and a rear bank 110B each constituting a corresponding cylinder is smaller than 90 degrees (e.g. 52 degrees). An air cleaner 41 and a throttle body 42 constituting an engine intake system is disposed in a V-shaped space formed between the front bank 110A and the rear bank 110B. The throttle body 42 is provided with an injector for injecting the fuel in the fuel tank 28. The air purified by the air cleaner 41 is mixed with fuel and the mixture is supplied to the front bank 110A and to the rear bank 110B. The exhaust pipes 18A and 18B constituting an engine exhaust system are connected to the banks 110A and 110B, respectively. The exhaust pipes 18A, 18B pass the right side of the vehicle body and connect at their rear ends with the exhaust mufflers 19A and 19B, respectively. Thus, exhaust gas is discharged via the exhaust pipes 18A, 18B and the exhaust mufflers 19A, 19B.

Figure 2:
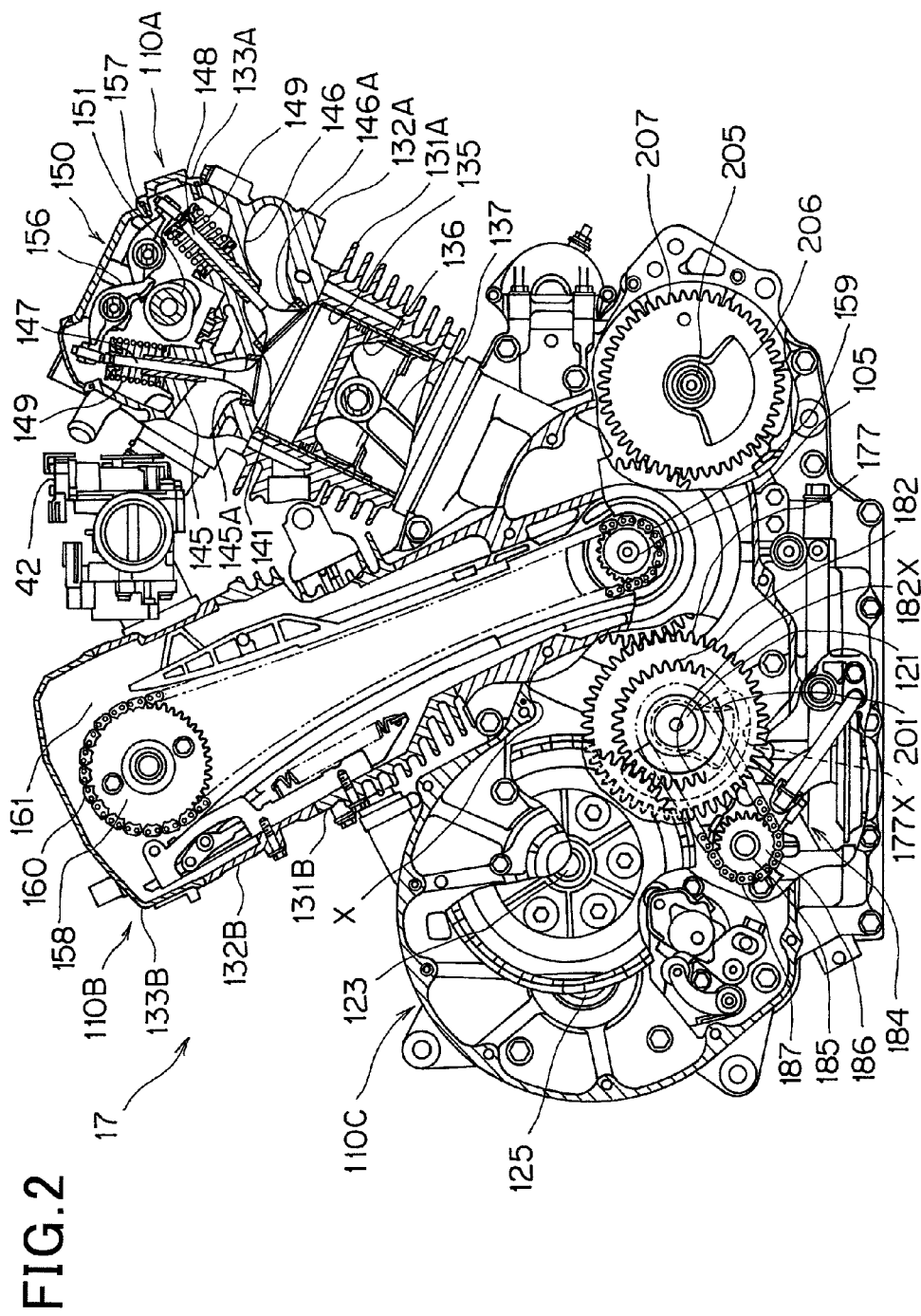
FIG. 2 illustrates an internal structure of the engine as viewed from the side.
Figure 3:
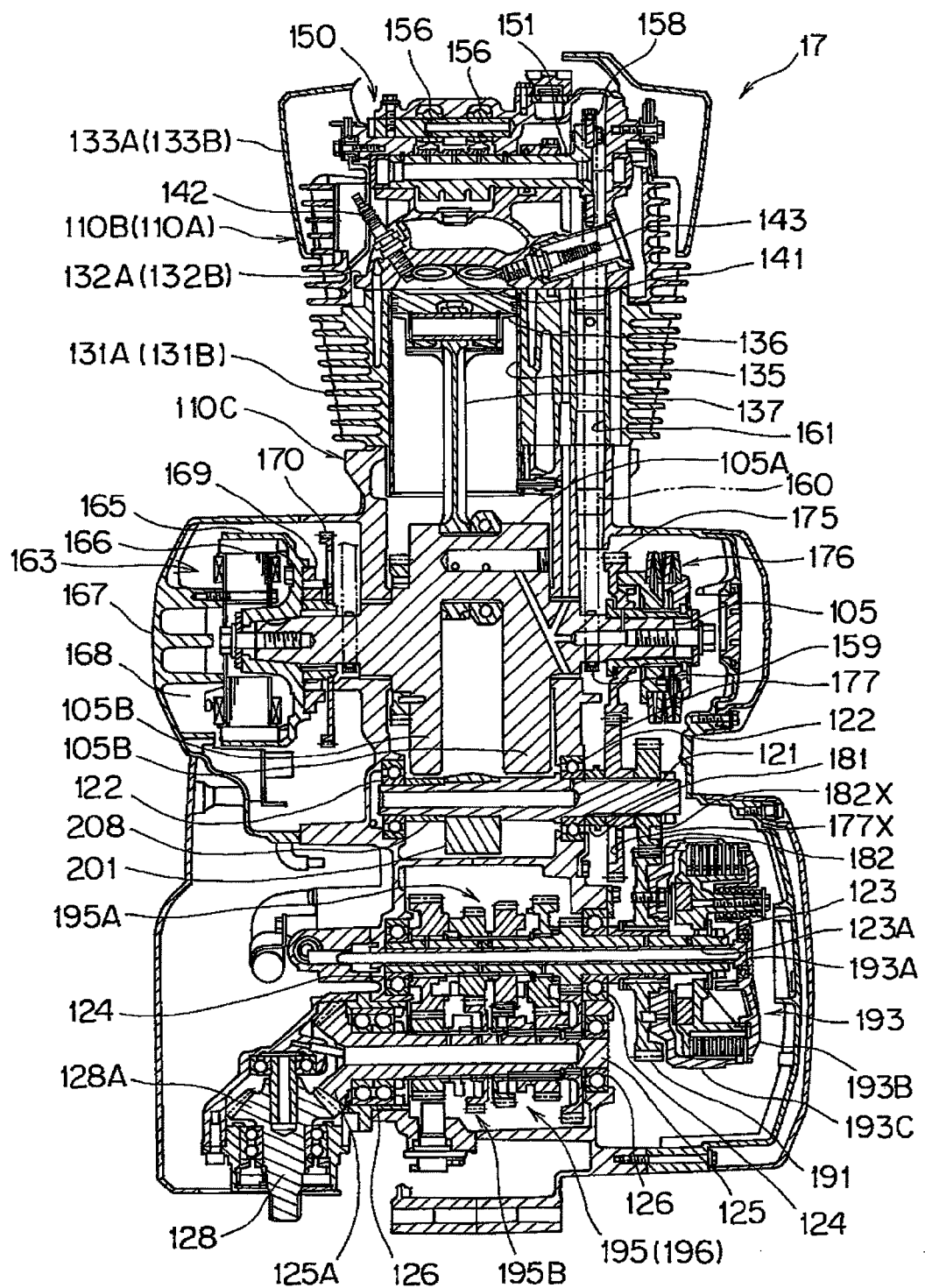
FIG. 3 is a cross-sectional view of the internal structure of the engine as viewed from the general rearward.

FIG. 2 is a lateral view illustrating the internal structure of the engine 17 and FIG. 3 is a cross-sectional view illustrating the internal structure of the engine 17 as viewed from the rearward. The front bank 110A and rear bank 110B of the engine 17 have the same structure. FIG. 2 illustrates the periphery of a piston in the front bank 110A and the periphery of a cam chain in the rear bank 110B. In addition, in FIG. 2, reference numerals 121, 123 and 125 indicates an intermediate shaft (a rear balancer shaft), a main shaft and a countershaft, respectively.

These shafts 121, 123, 125 including the crankshaft 105 are arranged parallel to and offset from one another in a back and forth direction and in a vertical direction in the vehicle body. A gear transmission mechanism for transmitting the rotation of the crankshaft 105 to the intermediate shaft 121, the main shaft 123 and the countershaft 125 in this order is configured in the crankcase 17C carrying these shafts. In addition, FIG. 3 corresponds to a cross-sectional view taken along a cross-section connecting the front bank 110A, the crankshaft 105, the intermediate shaft 121, the main shaft 123 and the countershaft 125 together with straight lines.

A front cylinder block 131A and a rear cylinder block 131B are formed on the upper surface of the crankcase 17C of the engine 17 so as to form a predetermined angle in the back and forth direction of the vehicle body. The front and rear cylinder heads 132A and 132B are respectively joined to the upper surfaces of the cylinder blocks 131A and the 131B. In addition, head covers 133A and 133B are attached to the upper surfaces of the cylinder heads 132A and 132B, respectively. Thus, the front and rear banks 110A, 110B are configured.

The cylinder blocks 131A, 131B are each formed with a cylinder bore 135. A piston 136 is slidably inserted into the cylinder bore 135. The piston 136 is connected to a crankpin (see FIG. 3) 105A of the crankshaft 105 via a connecting rod 137. As shown in FIG. 3, the crankpin 105A is provided at a position eccentric from the axial center of the crankshaft 105 with respect to a pair of left and right crank webs 105B, 105B formed integrally with the crankshaft 105. Because of this, when the piston 136 is moved, the moving force acts on the crankpin 105A via the connecting rod 137 to rotate the crankshaft 105.

Combustion hollows or recessed portions 141 constituting a ceiling surface of a combustion chamber formed on the piston 136 are formed at a lower surface with the each cylinder heads 132A, 132B. Ignition plugs 142, 143 are disposed at each of the combustion hollow or recessed portion 141 so that their tips face the combustion hollow or recessed portion 141. In addition, the combustion hollows or recessed portions 141 are each provided with opening portions 145A, 145B adapted to allow an intake port 145 and an exhaust port 146, respectively, formed in a corresponding one of the cylinder heads 132A, 132B to communicate with the inside of the combustion chamber as shown in FIG. 2.

An intake valve 147 for opening and closing the opening portion 145A of the intake port 145 and an exhaust valve 148 for opening and closing an opening portion 146A of the exhaust port 146 are provided at each of the cylinder heads 132A, 132B. The intake valve 147 and the exhaust valve 148 are biased in a port-closing direction by valve springs 149, 149, respectively. A valve train mechanism 150 for driving the valve bodies 147, 148 includes a camshaft 151 turnably supported between the intake valve 147 and the exhaust valve 148; and intake side and exhaust side rocker arms 156, 157 swung by corresponding cams provided on the camshaft 151. One end of each of the rocker arms 156, 157 comes into abutment against a corresponding one of upper portions of the intake valve 147 and the exhaust valve 148. The rocker arms 156, 157 are swung to press the intake valve 147 and the exhaust valve 148, respectively.

As shown in FIG. 3, a driven sprocket 158 is secured to one end side of the camshaft 151 and a drive sprocket 159 is secured to one end side of the crankshaft 105. A cam chain 160 is wound around the sprockets 158, 159. The sprockets 158, 159 and the cam chain 160 are housed in a cam chain chamber 161 formed on one end side of each of the banks 110A, 110B.

A reduction ratio between the drive sprocket 159 and the driven sprocket 158 is set at ½. If the crankshaft 105 is rotated, the drive sprocket 159 is driven integrally with the crankshaft 105 so that the driven sprocket 158 is rotated via the cam chain 160 at a rotation rate half that of the crankshaft 105. This rotation allows the intake valve 147 and the exhaust valve 148 to open and closes the intake port 145 and the exhaust port 146, respectively, in accordance with the cam profile of the camshaft 151 rotated integrally with the driven sprocket 158.

As shown in FIG. 3, a generator 163 is provided at the left end of the crankshaft 105. The generator 163 includes a rotor 165 secured to the crankshaft 105 and a stator 166 fixedly disposed inside the rotor 165. In addition, the generator 163 is housed in a generator housing chamber 168 inside a generator cover 167. The stator 166 is secured to the generator cover 167. A one-way clutch 169 is connected to the rotor 165 and a drive gear 170 of a starter motor is connected to the one-way clutch 169.

A drive gear 175, which hereinafter, called the crank side drive gear, is secured to the right end portion of the crankshaft 105 externally of the drive sprocket 159 (on the right side of the vehicle body). The crank side drive gear 175 is connected to the crankshaft 105 via a disk spring type torque damper 176 and in gear with a driven gear 177, which hereinafter, called the intermediate driven gear, provided on the intermediate shaft 121. Thus, the rotation of the crankshaft 105 is transmitted to and rotates the intermediate shaft 121 in a counter direction at the same rate as that of the crankshaft 105.

As shown in FIG. 2, the intermediate shaft 121 is supported by a pair of left and right bearings 122, 122 at a position rearward of and downward of the crankshaft 105 and forward of and downward of the main shaft 123. As shown in FIG. 3, the right end portion of the intermediate shaft 121 projects from the right bearing 122 and terminates in the vicinity of the right lateral wall of the crankcase 17C. An oil pump drive sprocket 181, the intermediate side driven gear 177 and a drive gear 182 that has a diameter smaller than that of the driven gear 177 and hereinafter called the intermediate side drive gear are sequentially attached to the right end portion of the intermediate shaft 121.

As shown in FIG. 2, the oil pump drive sprocket 181 transmits the rotational force of the intermediate shaft 121 via a transmission chain 187 to a driven sprocket 186 secured to a drive shaft 185 of an oil pump 184 to drive the oil pump 184. The oil pump 184 is disposed rearward of the intermediate shaft 121 and below the main shaft 123.

The intermediate side drive gear 182 is in gear with a driven gear 191, which hereinafter, called the main side driven gear, provided on the main shaft 123 for relative rotation. Thus, the rotation of the intermediate shaft 121 is reduced in speed and transmitted to the main shaft 123 via a clutch mechanism 193. In other words, a reduction rate between the intermediate side drive gear 182 and the main side driven gear 191 sets a reduction ratio between the crankshaft 105 and the main shaft 123, i.e., the primary reduction ratio of the engine 17.

The main shaft 123 is supported by a pair of left and right bearings 124, 124 at a position rearward of and above the crankshaft 105. A clutch operation shaft 193A passes through a through-hole 123A of the main shaft 123. A multi-disk clutch 193B constituting the clutch mechanism 193 is provided at the right end of the clutch operation shaft 193A. A clutch housing 193C of the multi-disk clutch 193B is meshed with the main side driven gear 191. The rotation of the intermediate shaft 121 is transmitted to the main shaft 123 through the engagement of the multi-disk clutch 193B.

The countershaft 125 is supported by a pair of left and right bearings 126, 126 at a position generally rearward of the main shaft 123. A speed-change gear group 195 is arranged between the main shaft 123 and the countershaft 125, which constitutes a transmission 196. For detailed description, the main shaft 123 is provided with drive gears 195A for six speeds. The countershaft 125 is provided with driven gears 195B for six speeds. The drive gears 195A and the driven gears 195B are such that corresponding speed steps are engaged with each other to constitute speed-change gear pairs corresponding to the respective associated speed steps. In addition, the speed-change gear pairs are reduced in reduction ratio in the order from first-speed to sixth-speed, which becomes higher-speed gears.

The countershaft 125 is integrally provided with a drive bevel-gear 125A at the left end. The drive bevel-gear 125A is meshed with a driven bevel-gear 128A integrally provided at the front end of a drive shaft 128 extending in the back and forth direction of the vehicle body. Thus, the rotation of the countershaft 125 is transmitted to the drive shaft 128.

Next, a description of a balancer structure of the engine 17 described above is given.

The engine 17 is provided with a two-shaft primary balancer in which primary balancers are arranged to be divided on the intermediate shaft 121 and the front balancer shaft 205, respectively. The intermediate shaft 121 and the front balancer shaft 205 are arranged at the front and rear of, and in parallel to the crankshaft 105 so that the crankshaft 105 is placed between the primary balancers. For detailed description, as shown in FIG. 2, the intermediate shaft 121 disposed rearward of and parallel to the crankshaft 105 is provided with a rear balancer weight 201 functioning as a primary balancer. In other words, the intermediate shaft 121 functions not only as a transmission shaft for transmitting the rotation of the crankshaft 105 to the main shaft 123 but as a rear balancer shaft of the two-shaft primary balancer.

Figure 4:
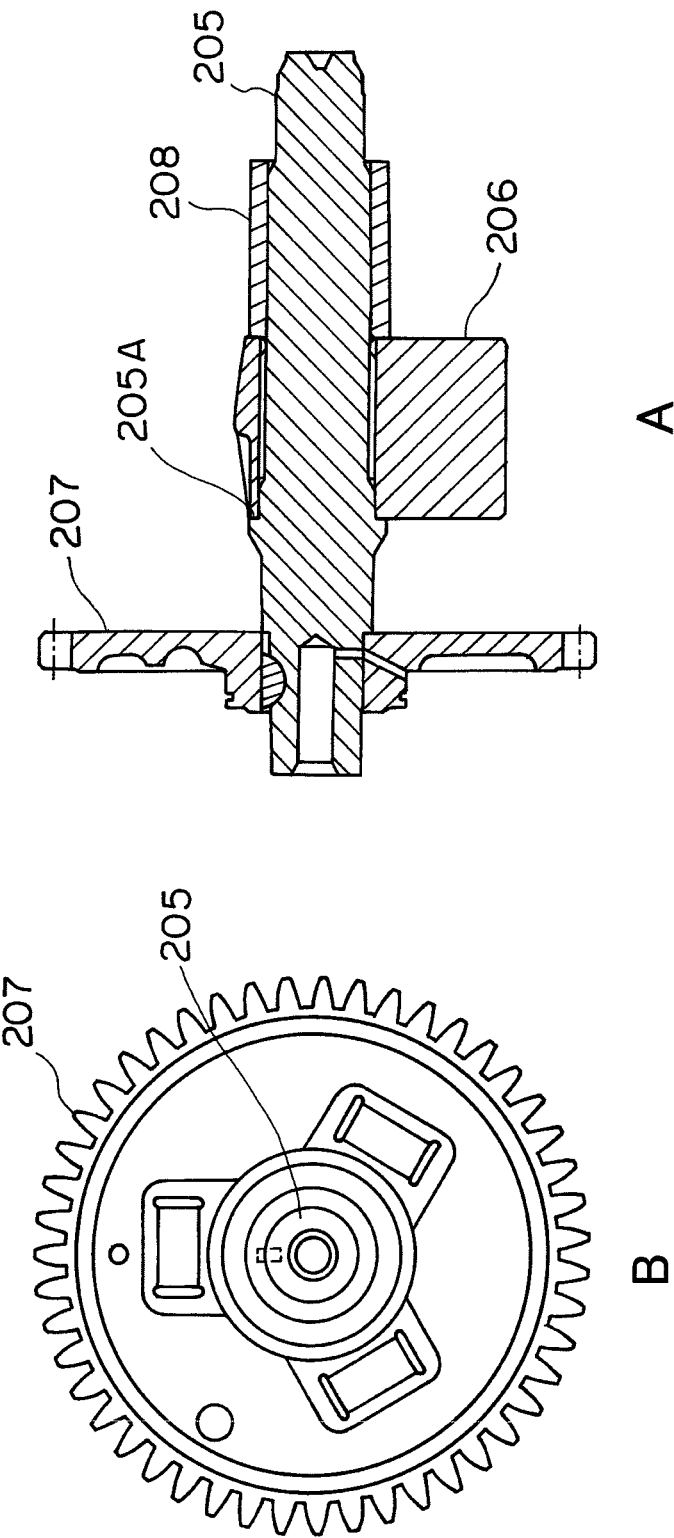
FIG. 4A illustrates a front balancer shaft along with the peripheral configuration thereof and FIG. 4B illustrates the front balancer shaft along with the peripheral configuration thereof as viewed from the side.

A front balancer shaft 205 is disposed forward of and parallel to the crankshaft 105. FIGS. 4A and 4B illustrate the front balancer shaft 205. As shown in these figures, similarly to the intermediate shaft 121, also the front balancer shaft 205 is provided with a balancer weight 206 functioning as a primary balancer and with a driven gear 207 in gear with the crankshaft 105. In addition, the front balancer shaft 205 is configured to be reversely rotatable in a counter direction at the same speed as the crankshaft 105.

As shown in FIG. 4A, the balancer weight 206 is spline-fitted to the front balancer shaft 205 to be abutted against and positioned by an enlarged-diameter portion 205A provided on the front balancer shaft 205 for positioning. In this state, the balancer weight 206 is secured by press fitting a metal cylindrical member 208 to the front balancer shaft 205. In addition, this weight attachment structure applies to the intermediate shaft (a rear balancer shaft) 121.

In the engine 17, the balancer weight 201 provided on the intermediate shaft 121 is slightly different in weight from the balancer weight 206 provided on the front balancer shaft 205. As shown in FIG. 2, the balancer weight 201 provided on the intermediate shaft 121 is formed smaller and lighter than the balancer weight 206 provided on the front balancer shaft 205 because of the following reasons.

In the engine 17, the intermediate side driven gear 177 provided on the intermediate shaft 121 and having a relatively large diameter, i.e., the driven gear 177 for transmitting the rotation of the crankshaft 105 to the primary balancer, the balancer weight 201, is formed to have such a balancer structure as that its gravity center position is eccentric from the rotational center of the gear 177. In addition, also the intermediate side drive gear 182 provided on the intermediate shaft 121 and having a relatively small diameter, i.e., the drive gear 182 for transmitting the rotation of the intermediate shaft 121 to the main shaft 123 is formed to have such a balancer structure as that its gravity center position is eccentric from the rotational center of the gear 182. More specifically, the intermediate side driven gear 177 is formed to have such a balancer structure as to function as a coupling balancer suppressing moment force produced relative to the gravity center X of the engine 17 (see FIG. 2). In addition, the intermediate side drive gear 182 is formed to have such a balancer structure as to function as the coupling balancer described above or as another balancer.

Figure 5:
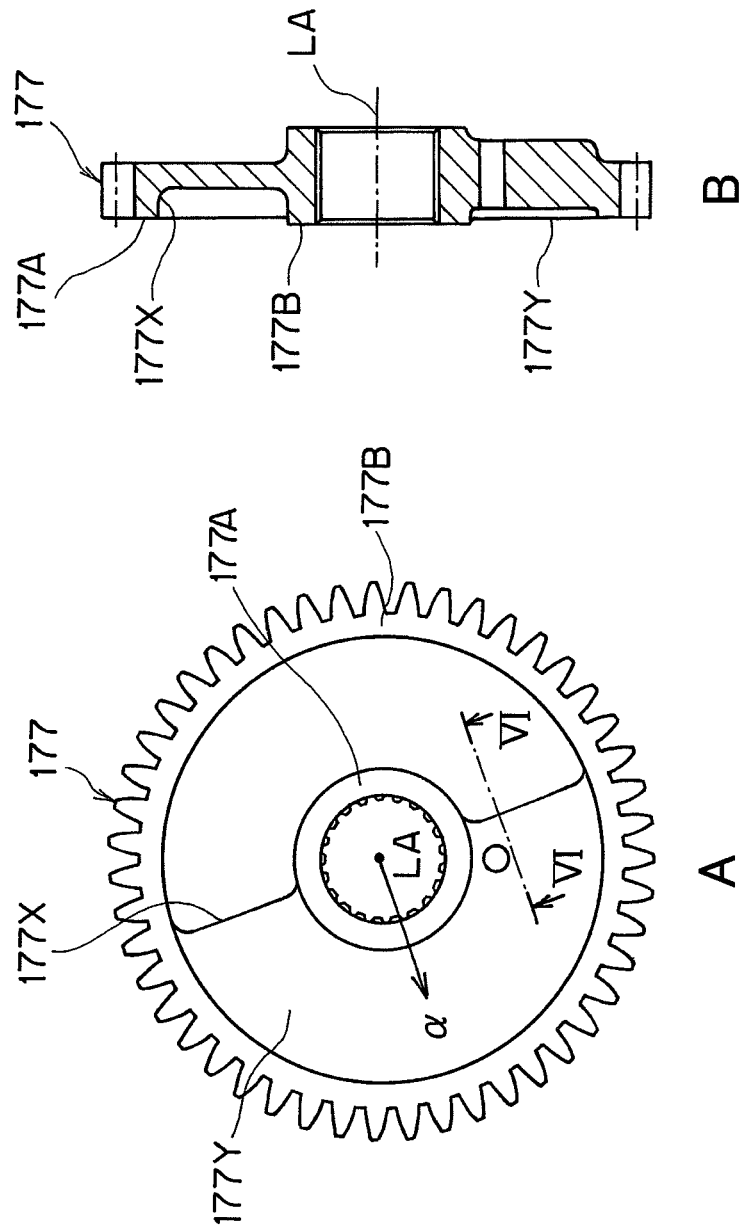
FIG. 5A is a plan view of an intermediate side driven gear and FIG. 5B is a lateral view of FIG. 5A.
Figure 6:
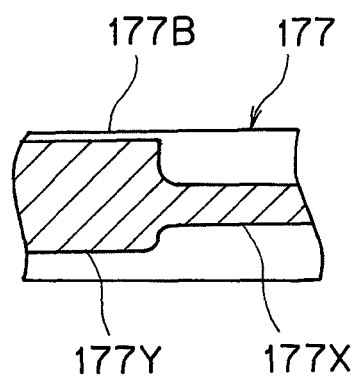
FIG. 6 is a cross-sectional view taken along line VI-VI of FIG. 5A.

More specifically, as shown in FIGS. 5A and 5B, the intermediate side driven gear 177 is partially provided with a thinned portion 177X with small thickness (narrow width) at an intermediate portion between an outer circumferential gear portion 177B and an insertion portion 177A inserted through the intermediate shaft 121. The thinned portion 177X is provided in a range of about 180 degrees around the rotational center LA of the gear 177 and along the radial direction. As shown in FIG. 6 which is a cross-sectional view taken along line VI-VI of FIG. 5A, the remaining area is a reference thick portion 177Y thicker than the thinned portion 177X. Thus, the intermediate side driven gear 177 is formed to have a gravity center position eccentric in an arrow a direction in FIG. 5A.

Figure 7:
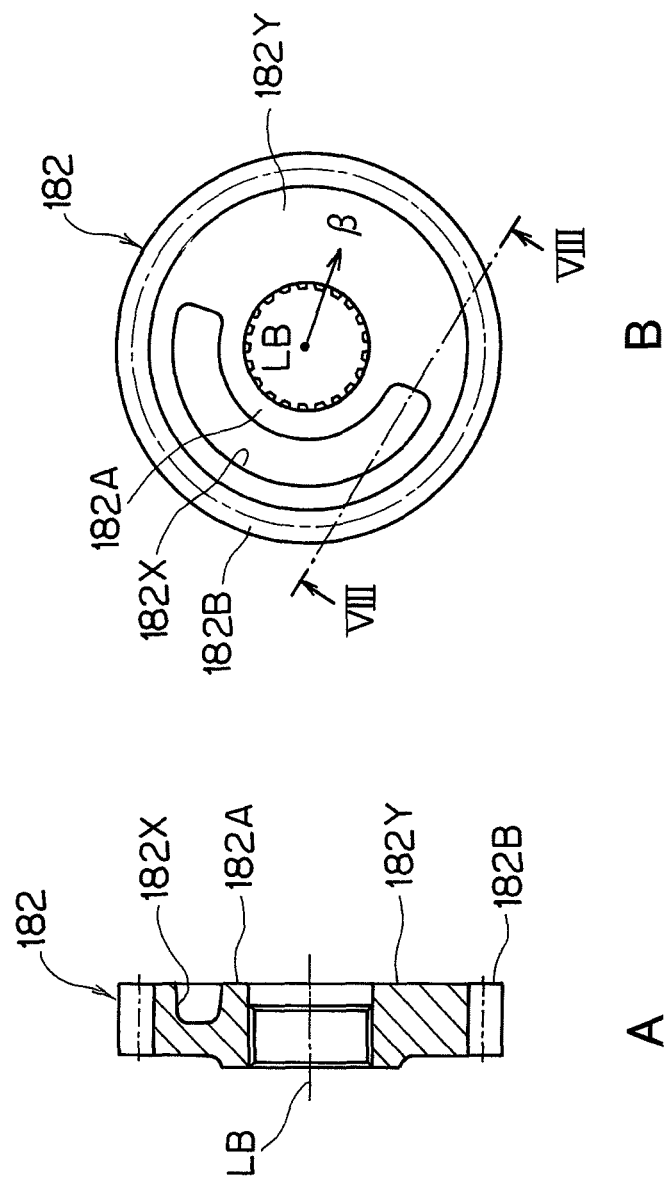
FIG. 7A is a lateral view of an intermediate side drive gear and FIG. 7B is a plan view of FIG. 7A.
Figure 8:
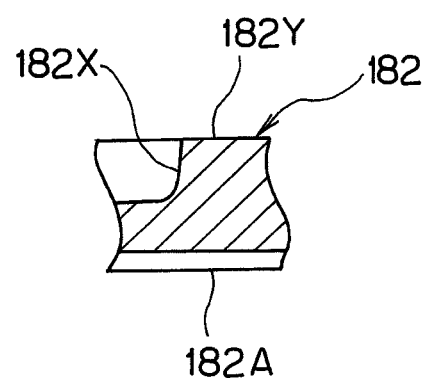
FIG. 8 is a cross-sectional view taken along line VIII-VIII of FIG. 7B.

As shown in FIGS. 7A and 7B, also the intermediate side drive gear 182 is partially provided with a thinned portion 182X with small thickness (narrow width) at an intermediate portion between an outer circumferential gear portion 182B and an insertion portion 182A inserted through the intermediate shaft 121. Similarly to the above, also the thinned portion 182X is provided in a range of about 180 degrees around the rotational center LB of the gear 182 and along the radial direction. As shown in FIG. 8 which is a cross-sectional view taken along line VIII-VIII of FIG. 7B, the remaining area is a reference thick portion 182Y thicker than the thinned portion 182X. Thus, the intermediate side drive gear 182 is formed to have a gravity center position eccentric in an arrow β direction in FIG. 6(B). These thinned portions 177X, 182X may integrally be provided at the time of molding the gears or may be provided by cutting work.

The vibration source of the engine 17 is composed of inertial force resulting from the reciprocation of the piston 136 and vibration resulting from combustion. Such vibratory components partially act as moment force around the gravity center X of the engine. Because of this, in the engine 17, the respective thinned portions 177X, 182X of the intermediate side driven gear 177 and the intermediate side drive gear 182 are set to have a phase angle therebetween and a distance, which is the distance from the rotational center LA, LB, therebetween in order to mainly suppress the moment force around the gravity center X resulting from the reciprocative weight of the engine 17. More specifically, the phase angle and distance between the thinned portions 177X and 182X are set to reduce the moment force resulting from the offset of the piston cylinder axis and from the fact that it is difficult to set the gravity center of the engine 17 at the center. In this case, as shown in FIG. 2, the thinned portions 177X, 182X are formed in the embodiment to have such layout as that their phases are the same.

If the intermediate side driven gear 177 and the intermediate side drive gear 182 are integrally provided with the respective thinned portions 177X and 182X functioning as coupling balancers, they produce a component contributing to the primary balancer.

Because of this, the embodiment forms the balancer weight 201 provided on the intermediate shaft 121 taking into account the contributing component. Specifically, the balancer weight 201 is formed by reducing the contributing component mentioned above therefrom with respect to the necessary primary weight, which is the same weight as the balancer weight 206. In other words, the balancer weight 201, intermediate side driven gear 177 and intermediate side drive gear 182 of the intermediate shaft 121 constitute the coupling balancer while ensuring the primary balancer.

In addition, depending on the necessary amount of the coupling balancer, only the intermediate side driven gear 177 is formed to have the balancer structure by providing the thinned portion 177X without provision of the thinned portion 182X for the intermediate side drive gear 182.

As described above, according to the present embodiment, since the two-shaft primary balancer that is rotated at the same speed as, and in a counter direction to the crankshaft 105 is provided, the primary inertial force of the engine 17 whose cylinders do not have an angle of 90 degrees can be reduced to reduce the primary vibration of the engine 17.

In addition, in the embodiment, the intermediate side driven gear 177 transmitting the rotation of the crankshaft 105 to the primary balancer is integrally provided with the coupling balancer suppressing the moment force resulting from the reciprocative weight of the engine 17. Therefore, the coupling vibration can be reduced in addition to the primary vibration. It is possible, thus, to reduce the moment force resulting from the offset of the piston cylinder axis and from the fact that it is difficult to set the gravity center of the engine 17 at the center.

In this case, the intermediate shaft 121 is used as a balancer shaft shared by the primary balancer and the coupling balancer. Therefore, the number of components can be reduced compared with the provision of a balancer dedicated to the coupling balancer and of a balancer shaft. This can reduce the size and weight of the engine 17. In addition, load stress acting on the intermediate shaft 121 can be reduced compared with provision of a coupling balancer dedicated to the intermediate shaft.

Further, in the present embodiment, also the intermediate side drive gear 182 provided on the intermediate shaft 121, i.e., the drive gear 182 transmitting the rotation of the intermediate shaft 121 to the main shaft 123 of the engine 17 is formed to have the balancer structure. Therefore; along with the balancer structure of the intermediate side driven gear 177, the engine vibration to be targeted can accurately be reduced and the flexibility of layout of various engine portions can be enhanced.

Since the intermediate side driven gear 177 and the intermediate side drive gear 182 are each formed to have a balancer structure, the engine reduced in coupling vibration can be provided by slightly modifying the existing two-shaft primary balancer-equipped engine. In addition, the coupling balancer functioning as a moment balancer can be disposed at a position close to the gravity center X of the engine 17. Therefore, the vehicle body can be handled with ease.

The balancer structure of the present embodiment can take vibration-measures against the individual vibrations of various vibrations included in the engine vibrations. For example, vibration greater than small energy vibration resulting from combustion and usually buried in the inertial force of the engine 17 is reduced to adjustably provide an engine character capable of feeling combustion. In addition, it is possible to significantly reduce individual measurements against vibration elements tending to propagate to an occupant or against vibration elements relatively high in vibratory intensity.

The present invention has been described thus far based on the embodiment but is not limited to this. The invention can be modified in design in various ways. For example, the present embodiment describes the case where the invention is applied to the balancer structure of the V-type 2-cylinder engine. However, the invention is not limited to this. For example, in a single-cylinder one-shaft primary balancer structure, the respective operating point misalignments of the engine gravity center, the crank center and the primary balancer complicatedly action as coupling vibrations. The present invention can be applied to reduce such coupling vibrations. In addition, the present invention can be applied to the coupling balancer structure of a 3-cylinder engine.

The above embodiment describes the case where the balancers for the primary vibration component relatively problematic with respect to sensible vibration are provided. However, the present invention is not limited to this and can be applied to a balancer structure with respect to a secondary vibration component or the like. In this case, the present invention needs only to be applied to a structure in which a balancer for canceling secondary vibration is integrally provided on a gear rotated at a rotational rate twice that of the crankshaft 105.

The embodiment describes the case where the present invention is applied to the engine balancer device for motorcycles. However, the invention is not limited to this and can be applied to an engine balancer device for other vehicles such as three-wheeled vehicle, four-wheeled vehicles and the like classified into ATVs (All Terrain Vehicles).

The invention claimed is:

1. An engine balancer device equipped with an inertial force balancer provided with a balancer weight rotated synchronously with a crankshaft of an engine to prevent vibration resulting from reciprocative weight of the engine, comprising:

wherein the balancer weight includes a primary balancer rotated at the same speed as, and in a counter direction to the crankshaft and a first coupling balancer and a second coupling balancer for suppressing moment force resulting from the reciprocative weight of the engine, the primary balancer is a two-shaft primary balancer arranged to be divided into a front balancer weight provided on a front balancer shaft in front of the crankshaft and a weight provided on a rear balancer shaft in the rear of the crankshaft, the weight provided on the rear balancer shaft is composed of a rear balancer weight provided on the rear balancer shaft, the first coupling balancer integrally provided on a driven gear mounted on the rear balancer shaft for transmitting rotation of the crankshaft to the rear balancer shaft and the second coupling balancer integrally provided on a drive gear mounted on the rear balancer shaft for transmitting rotation of the balancer shaft to a main shaft of the engine;

the rear balancer weight is arranged on an inner side of both ends of the rear balancer shaft;

the driven and drive gears are provided on the same side in a one end side of the rear balancer shaft spaced apart from the rear balancer weight, and the rear balancer weight and the first and second coupling balancers are configured to cancel engine vibrations resulting from the moment force generated on the engine.

2. The engine balancer device according to claim 1, wherein the engine is a motorcycle engine in which cylinders are arranged in a V-shape so as to be spaced apart from each other at a predetermined angle in a back and forth direction and a transmission is provided integrally with and rearward of the engine.

3. The engine balancer device according to claim 1, wherein said front balancer weight is spline-fitted to said front balancing shaft into abutment with an enlarged diameter portion of said front balancing shaft with a cylindrical member for retaining said front balancer weight relative to said front balancing shaft.

4. The engine balancer device according to claim 1, wherein said driven gear includes a thinned portion disposed around a predetermined area between an outer circumferential gear portion and an insertion portion.

5. The engine balancer device according to claim 4, wherein said driven gear includes a thicker portion disposed around a predetermined area between the outer circumferential gear portion and the insertion portion, said thicker portion being thicker relative to said thinned portion.

6. The engine balancer device according to claim 4, wherein said thinned portion is disposed around approximately 180° of said outer circumferential gear portion and the insertion portion.

7. The engine balancer device according to claim 5, wherein said thicker portion is disposed around approximately 180° of said outer circumferential gear portion and the insertion portion.

\* \* \* \* \*